( 12 ) United States Patent
Gotman

(10) Patent No.: US 9,596,676 B2
(45) Date of Patent: Mar. 14, 2017

(54) CALIBRATION OF A DOWNLINK TRANSMIT PATH OF A BASE STATION

(71) Applicant: QUALCOMM Incorporated, San Diego, CA (US)

(72) Inventor: Maxim Gotman, Kfar-Saba (IL)

(73) Assignee: QUALCOMM Incorporated, San Diego, CA (US)

( * ) Notice: Subject to any disclaimer, the term of this patent is extended or adjusted under 35 U.S.C. 154(b) by 408 days.

(21) Appl. No.: 14/172,670

(22) Filed: Feb. 4, 2014

(65) Prior Publication Data

US 2014/0226511 A1    Aug. 14, 2014

Related U.S. Application Data

(60) Provisional application No. 61/764,169, filed on Feb. 13, 2013.

(51) Int. Cl.
*H04L 12/28*    (2006.01)
*H04W 72/04*    (2009.01)
(Continued)

(52) U.S. Cl.
CPC .......... *H04W 72/042* (2013.01); *H04B 17/11* (2015.01); *H04B 17/12* (2015.01);
(Continued)

(58) Field of Classification Search
CPC ........ H04B 17/11; H04B 17/12; H04B 17/14; H04B 17/24; H04B 7/0417; H04W 52/04; H04W 52/08; H04W 5/0048; H04W 72/042
See application file for complete search history.

(56) References Cited

U.S. PATENT DOCUMENTS 5,592,490 A    1/1997 Barratt et al.
5,809,063 A    9/1998 Ashe et al.
(Continued)

OTHER PUBLICATIONS

ISA/EPO, International Search Report and Written Opinion of the International Searching Authority, Int'l. App. No. PCT/US2014/014837, May 28, 2014, European Patent Office, Rijswijk, NL, 11 pgs.

(Continued)

*Primary Examiner* — Jutai Kao
(74) *Attorney, Agent, or Firm* — Holland & Hart LLP

(57) ABSTRACT

Methods, systems, and devices are described for calibrating a transmit path of a base station. A calibration symbol of a subframe may be generated for transmission on a downlink channel. The calibration symbol of the subframe may be transmitted. The calibration symbol may include a predefined waveform to calibrate the transmit path of the base station. At least part of the subframe including the calibration symbol may be received through a dedicated feedback receive path. The transmit path may be calibrated based at least in part on the received calibration symbol. The calibration symbols may replace one or more data symbols of the subframe. Control symbols may also be transmitted during the subframe. The control symbols may include reference signals and downlink control channels. The control symbols may signal to a mobile device a zero allocation of downlink resources during the subframe.

26 Claims, 9 Drawing Sheets

(51) Int. Cl.
*H04B 17/24* (2015.01)
*H04L 1/00* (2006.01)
*H04L 1/20* (2006.01)
*H04L 1/24* (2006.01)
*H04B 17/11* (2015.01)
*H04B 17/12* (2015.01)
*H04B 17/14* (2015.01)
*H04W 52/08* (2009.01)
*H04B 7/04* (2006.01)
*H04L 1/06* (2006.01)
*H04L 1/18* (2006.01)

(52) U.S. Cl.
CPC ............ *H04B 17/14* (2015.01); *H04B 17/24* (2015.01); *H04L 1/0026* (2013.01); *H04L 1/20* (2013.01); *H04L 1/243* (2013.01); *H04B 7/0417* (2013.01); *H04L 1/06* (2013.01); *H04L 1/1867* (2013.01); *H04W 52/08* (2013.01)

(56) References Cited

U.S. PATENT DOCUMENTS

| | | |
|---|---|---|
| 6,615,024 B1 | 9/2003 | Boros et al. |
| 7,720,034 B2 | 5/2010 | Seo et al. |
| 8,134,976 B2 | 3/2012 | Wallace et al. |
| 8,140,102 B2 | 3/2012 | Nory et al. |
| 2004/0219884 A1 | 11/2004 | Mo et al. |
| 2005/0156662 A1 | 7/2005 | Raghupathy et al. |
| 2005/0181749 A1* | 8/2005 | Lee ............ H03F 1/3247 455/126 |
| 2009/0046693 A1* | 2/2009 | Nory ............ H04W 52/08 370/343 |
| 2009/0186590 A1* | 7/2009 | Gale ............ H04B 17/21 455/272 |
| 2010/0008407 A1* | 1/2010 | Izumi ............ H04B 17/21 375/219 |
| 2013/0088985 A1* | 4/2013 | Park ............ H04W 48/16 370/252 |
| 2014/0092784 A1* | 4/2014 | Khayrallah ........ H04L 1/1887 370/280 |
| 2014/0133470 A1* | 5/2014 | McGowan ......... H04W 72/082 370/336 |

OTHER PUBLICATIONS

IPEA/EPO, Second Written Opinion of the International Preliminary Examining Authority, Int'l. Appl. No. PCT/US2014/014837, Feb. 9, 2015, European Patent Office, Rijswijk, NL, 4 pgs.

* cited by examiner

CALIBRATION OF A DOWNLINK TRANSMIT PATH OF A BASE STATION

CROSS REFERENCES

The present Application for Patent claims priority to U.S. Provisional Patent Application No. 61/764,169 by Gotman, entitled "CALIBRATION OF A DOWNLINK TRANSMIT PATH OF A BASE STATION," filed Feb. 13, 2013, assigned to the assignee hereof, and expressly incorporated by reference herein.

BACKGROUND

The following relates generally to wireless communication, and more specifically to systems and methods to calibrate a transmit path of a base station. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices. Base stations may communicate with mobile devices on downstream and upstream links. Each base station has a coverage range, which may be referred to as the coverage area of the cell. During system operation of the base station, various base station components may introduce impairments into the downlink transmit path (e.g., due to thermal and temporal variations). These impairments may deteriorate the quality of a downlink signal transmitted from the base station.

SUMMARY

The described features generally relate to one or more improved methods, systems, and devices for calibrating a transmit path for a base station. At least one calibration symbol of a subframe may be generated for transmission on a downlink channel. The calibration symbol may include a predefined or pre-stored waveform. The waveform may be used to calibrate the transmit path of the base station. For example, the waveform may be used to compensate for impairments in the transmit path caused by variations in the radio frequency (RF) components of the transmit chain. The calibration symbol may replace one or more data symbols of the subframe. Control symbols may also be transmitted during the subframe. The control symbols may, for example, be associated with downlink reference signals and downlink control channels to allow a mobile device to perform various timing and synchronization procedures. The control symbols may be used to signal to a mobile device that the mobile device has received zero allocation of downlink resources during the subframe.

A method for calibrating a transmit path of a base station is described. A calibration symbol of a subframe may be generated. The calibration symbol of the subframe may be transmitted on a downlink channel. The calibration symbol may include a predefined waveform to calibrate the transmit path of the base station. At least part of the subframe may be received, through a dedicated feedback receive path. The received part of the subframe may include the calibration symbol.

In one example, the transmit path of the base station may be calibrated based at least in part on the received calibration symbol. In one configuration, a transmit path impairment may be estimated based on the received calibration symbol. A compensation value may be determined based at least in part on the transmit path impairment. The transmit path of the base station may be calibrated based on the compensation value. Transmissions on the downlink channel may be monitored through the dedicated feedback receive path.

In one embodiment, a control symbol of the subframe may be transmitted. The control symbol may be associated with one or both of a downlink reference signal and a downlink control channel. The control symbol of the subframe may be transmitted to signal to the mobile device zero allocation of downlink resources during the subframe.

In one configuration, downlink data may be transmitted, at a media access control (MAC) layer, to a mobile device during the subframe. In one embodiment, the downlink data may be replaced, at a physical (PHY) layer, with the predefined waveform. A negative acknowledgement (NACK) may be received from the mobile device, and the downlink data may be retransmitted at the MAC layer according to a hybrid automatic repeat request (HARQ) procedure.

In one embodiment, a data symbol of the subframe may be replaced with the calibration symbol. The predefined waveform may include a representation of a maximum transmitted power signal of a power amplifier over maximum useful channel bandwidth. The predefined waveform may be used to estimate digital pre-distortion coefficients for linearization of the power amplifier.

In one configuration, the predefined waveform may include an a priori tone to estimate an in-phase/quadrature (I/Q) imbalance of the transmit path. The predefined waveform may be used to estimate an image caused by the I/Q imbalance in the transmit path. The I/Q imbalance may be estimated based at least in part on the estimated image.

In one embodiment, a first transmit path of a first antenna of the base station may be calibrated during a first slot of the waveform. The first slot may include a calibration symbol to carry a first predefined waveform to calibrate the first transmit path of the first antenna. In one configuration, a second transmit path of a second antenna of the base station may be calibrated during a second slot of the waveform. The second slot may include a calibration symbol to carry a second predefined waveform to calibrate the second transmit path of the second antenna.

In one example, at least three additional symbols that include downlink reference signals may be transmitted. The downlink control channels may include at least one of a Physical Downlink Control Channel (PDCCH), a Physical Control Format Indicator Channel (PCFICH), or a Physical Hybrid Automatic Request Indicator Channel (PHICH).

A base station configured to calibrate a transmit path is also described. The base station may include a processor and a memory in electronic communication with the processor. Instructions may be stored in the memory. The instructions may be executable by the processor to generate a calibration symbol of a subframe, transmit the calibration symbol of the subframe on a downlink channel, and receive at least part of the subframe including the calibration symbol. The calibration symbol may include a predefined waveform to calibrate the transmit path of the base station. The at least part of the subframe may be received through a dedicated feedback receive path.

An apparatus for calibrating a transmit path of a base station is also described. The apparatus may include means for generating a calibration symbol of a subframe, means for transmitting the calibration symbol of the subframe on a downlink channel, and means for receiving at least part of the subframe including the calibration symbol. The calibration symbol may include a predefined waveform to calibrate the transmit path of the base station. The at least part of the subframe may be received through a dedicated feedback receive path.

A computer program product for calibrating a transmit path of a base station is also described. The computer program product includes a non-transitory computer-readable medium storing instructions executable by a processor to generate a calibration symbol of a subframe, transmit the calibration symbol of the subframe on a downlink channel, and receive at least part of the subframe including the calibration symbol. The calibration symbol may include a predefined waveform to calibrate the transmit path of the base station. The at least part of the subframe may be received through a dedicated feedback receive path.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In Long Term Evolution (LTE) base stations (evolved Node Bs (eNBs)), the transmit paths of downlink communications may be calibrated to compensate for various impairments introduced by various RF components in the transmit path. In some cases, the calibration procedure may be performed during manufacture and/or on system startup. These procedures may use specially constructed and optimized waveforms that are transmitted through the transmit chain and then received through a dedicated receive feedback path. The feedback path may be used to estimate the impairments and derive compensation values.

In one embodiment, the impairments may be subject to thermal and temporal variations. As a result, periodic calibration procedures may be executed during system operation of the eNB. In one embodiment, a specially constructed subframe may be transmitted through the transmit path and received through the dedicated receive feedback path. In one configuration, symbols of the subframe that include control information may remain unchanged. However, the subframe may include calibration symbols in place of data symbols. The calibration symbols may include a predefined waveform that may be used by a receiver of the dedicated feedback receive path to estimate the impairments of the transmit path. The estimated impairments may be used to derive and/or estimate compensation values (i.e., coefficients) to compensate for these impairments. As a result, the transmit path of the base station may be calibrated during normal operating states by substituting predefined waveforms for data traffic that is typically transmitted during the data symbols of the subframe.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
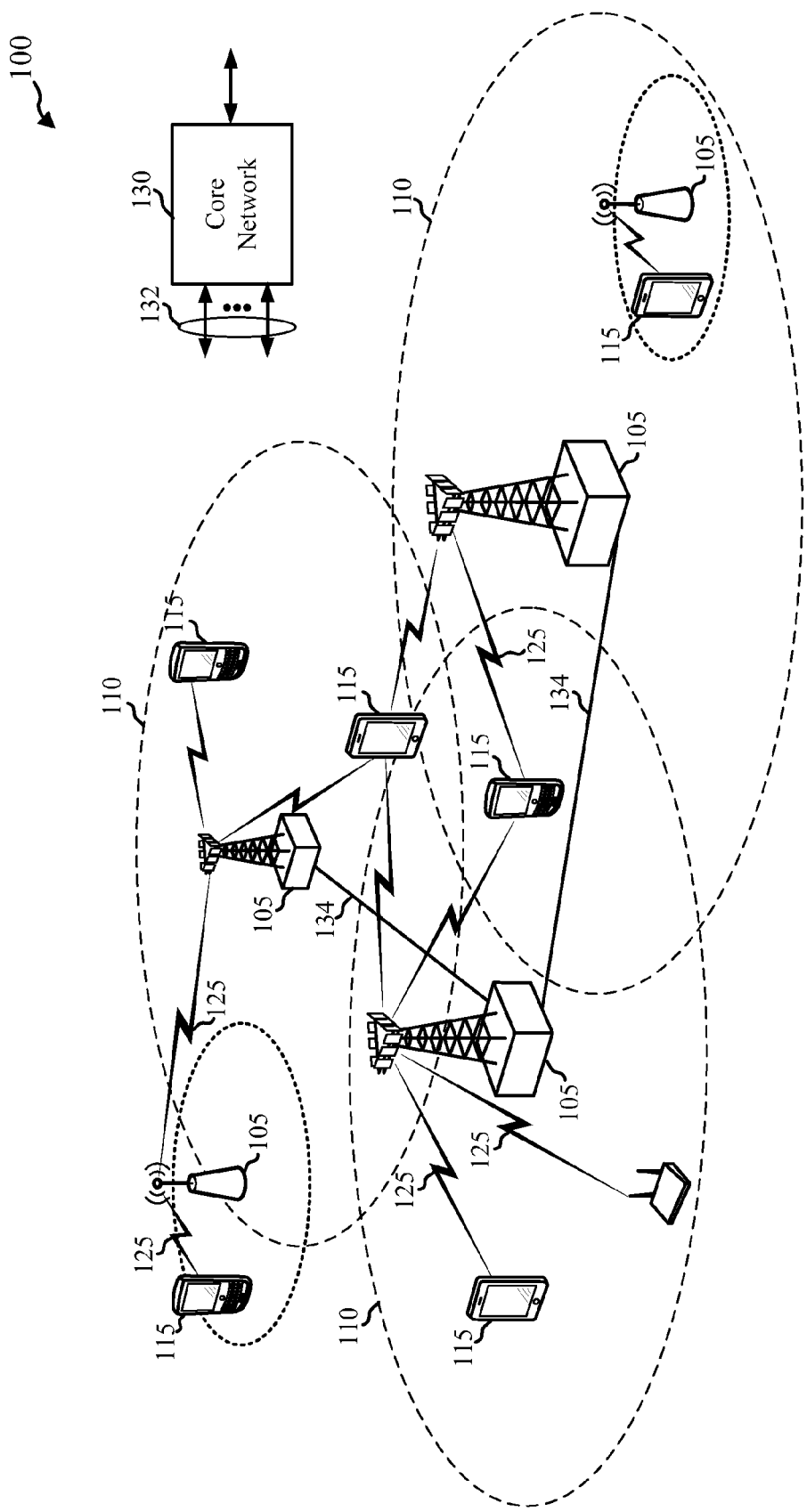
FIG. 1 shows a block diagram of a wireless communications system.

Referring first to FIG. 1, a diagram illustrates an example of a wireless communications system 100. The system 100 includes base stations (or cells) 105, communication devices 115, and a core network 130. The base stations 105 may communicate with the communication devices 115 under the control of a base station controller, which may be part of the core network 130 or the base stations 105 in various embodiments. Base stations 105 may communicate control information and/or user data with the core network 130 through backhaul links 132. In some embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters may transmit modulated signals simultaneously on the multiple carriers. For example, each communication link 125 may be a multi-carrier signal modulated according to various radio technologies. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective geographic area 110. In some embodiments, base stations 105 may be referred to as a base transceiver station, a radio base station, an access point, a radio transceiver, a basic service set (BSS), an extended service set (ESS), a NodeB, an evolved NodeB (eNodeB or eNB), Home NodeB, a Home eNodeB, or some other suitable terminology. The coverage area 110 for a base station may be divided into sectors making up only a portion of the coverage area. The system 100 may include base stations 105 of different types (e.g., macro, micro, and/or pico base stations). There may be overlapping coverage areas for different technologies.

In some embodiments, the system 100 may be an LTE/LTE-A network. In LTE/LTE-A networks, the terms evolved Node B (eNB) and user equipment (UE) may be generally used to describe the base stations 105 and devices 115, respectively. The system 100 may be a Heterogeneous LTE/LTE-A network in which different types of eNBs provide coverage for various geographical regions. For example, each eNB 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells. In one embodiment, the transmit path of an eNB 105 may be calibrated during operation of the eNB 105. The eNB 105 may generate or access predefined waveforms that may be used to calibrate the transmit path. The waveforms may be inserted in calibration symbols of a subframe. The calibration symbols of the subframe may be used in place of data symbols. Following the calibration procedure, transmission of data symbols may resume.

The core network 130 may communicate with the eNBs 105 via a backhaul 132 (e.g., S1, etc.). The eNBs 105 may also communicate with one another, e.g., directly or indirectly via backhaul links 134 (e.g., X2, etc.) and/or via backhaul links 132 (e.g., through core network 130). The wireless system 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

The UEs 115 may be dispersed throughout the wireless system 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In one configuration, the UE 115 may monitor for downlink transmissions from the eNB 105. When a subframe with calibration symbols is transmitted by the eNB 105, control symbols of the subframe may signal to the UE 115 that the UE has been allocated zero downlink resources during the subframe. As a result, the UE 115 may cease monitoring for downlink traffic data during the subframe.

The transmission links 125 shown in network 100 may include uplink transmissions from a mobile device 115 to a base station 105, and/or downlink transmissions, from a base station 105 to a mobile device 115. The downlink transmissions may also be called forward link transmissions while the uplink transmissions may also be called reverse link transmissions. While the wireless system 100 is described in relation to LTE/LTE-Advanced architectures, those skilled in the art will readily appreciate, the various concepts presented throughout this disclosure may be extended to other types of wireless networks.

Figure 2:
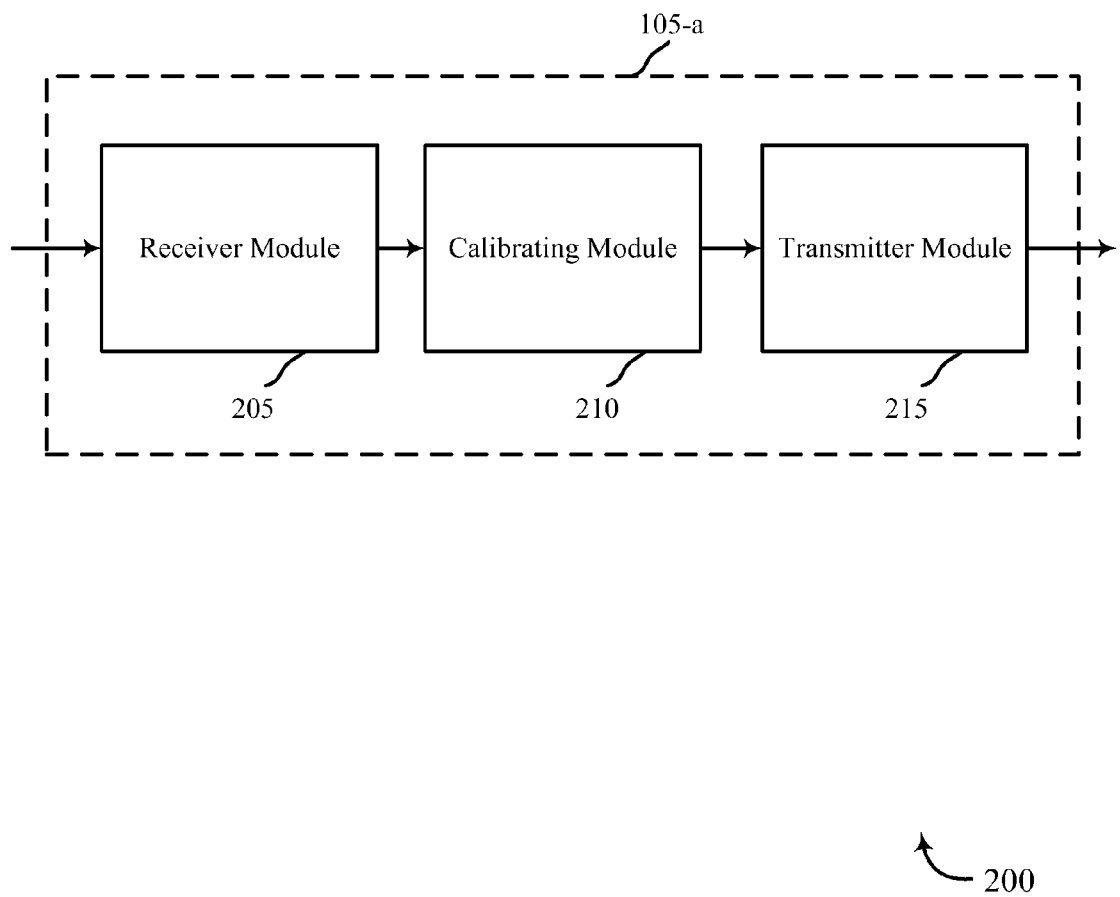
FIG. 2 is a block diagram illustrating one embodiment of a base station in accordance with the present systems and methods.

FIG. 2 is a block diagram 200 illustrating one embodiment of an eNB 105-a in accordance with the present systems and methods. The eNB 105-a may be an example of the eNB 105 illustrated in FIG. 1. The eNB 105-a may include a receiver module 205, a calibrating module 210, and a transmitter module 215. Each of these components may be in communication with each other.

These components of the eNB 105-a may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one configuration, the receiver module 205 may include a cellular receiver and may receive transmissions from a UE 115. Traffic data, control signals, etc. may be transmitted via the transmitter module 215 to one or more UEs 115. In one embodiment, the calibrating module 210 may generate a calibration symbol of a subframe. The subframe may be a subframe from within an LTE downlink radio frame. In one configuration, the calibration symbol may include a predefined waveform. In some cases, the waveform may be received, such as through a dedicated feedback receive path, by the receiver module 205 and/or the calibrating module 210. The waveform may be used by the module 210 to calibrate a transmit path of the eNB 105-a. Additional details regarding the calibrating module 210 will be described below.

Figure 3:
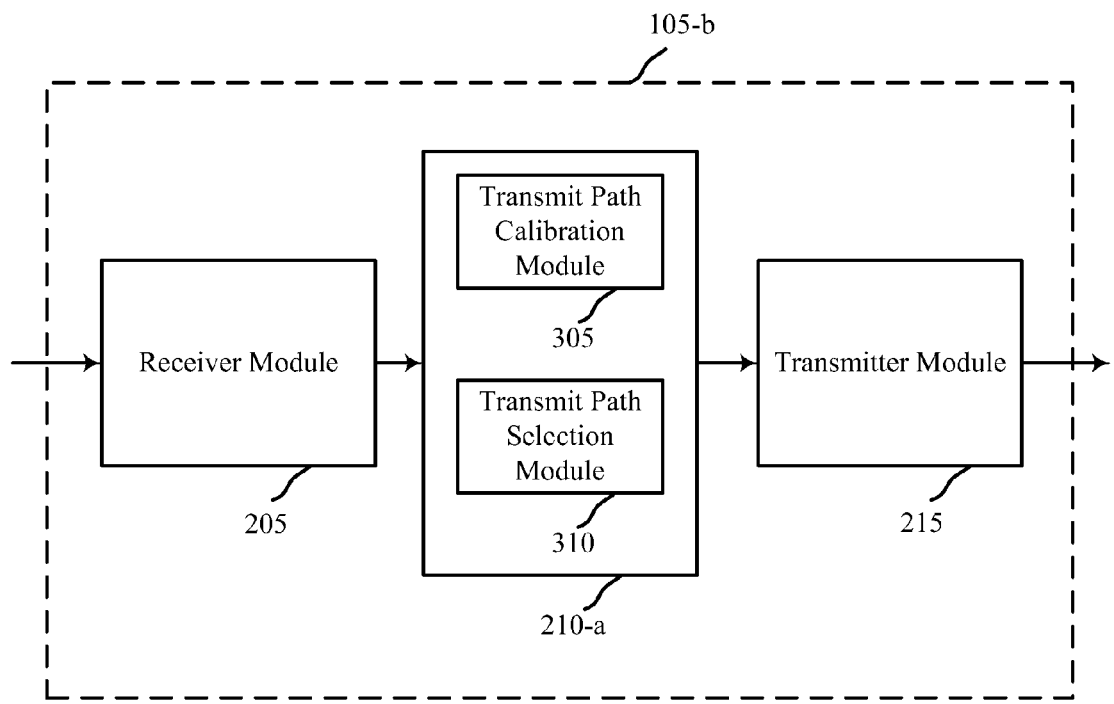
FIG. 3 is a block diagram illustrating a further embodiment of a base station in accordance with the present systems and methods.

FIG. 3 is a block diagram 300 illustrating one embodiment of an eNB 105-*b* in accordance with the present systems and methods. The eNB 105-*b* may be an example of the eNB 105 illustrated in FIGS. 1 and/or 2. The eNB 105-*b* may include a receiver module 205, a calibrating module 210-*a*, and a transmitter module 215. Each of these components may be in communication with each other.

These components of the eNB 105-*b* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one configuration, the receiver module 205 and the transmitter module 215 may perform various receiving and transmitting operations as previously described. In one embodiment, the calibrating module 210-*a* may include a transmit path calibration module 305 and a transmit path selection module 310.

The transmit path calibration module 305 may monitor downlink transmissions through a dedicated feedback receive path. The module 305 may receive at least part of a subframe on the downlink channel via the dedicated feedback receive path. In one embodiment, at least part of the subframe may include a calibration symbol that includes a predefined waveform. The transmit path calibration module 305 may use the predefined waveform to calibrate the transmit path of the eNB 105-*b*.

In one configuration, the transmit path selection module 310 may monitor downlink transmissions from a number of antennas of the eNB 105-*b*. The module 310 may monitor these transmissions through the dedicated feedback receive path. The selection module 310 may receive at least part of a subframe via the receive path. The subframe may include a first slot. The first slot may include at least one calibration symbol. The first calibration symbol may include a first predefined waveform. In one configuration, the selection module 310 may select a first transmit path of a first antenna. The selected first transmit path may be calibrated during the first slot of the subframe using the first predefined waveform.

During a second slot of the subframe, the transmit path selection module 310 may select a second transmit path of a second antenna of the eNB 105-*b*. The second slot may include at least one calibration symbol. The symbol may include a second predefined waveform. The first and second waveforms may be different, or they may be the same. In one example, the second transmit path selected by the module 310 may be calibrated using the second predefined waveform during the second slot of the subframe. The transmit path selection module 310 may continue to select different transmit paths to calibrate during at least a part of different slots of a downlink subframe. For multiple radio antennas and a single feedback pipe, certain calibration symbols from different transmit paths may be sampled. As an example, for two antenna ports, symbols 1, 2, 3, 4, 5, and 6 of slot 0 of the subframe may be sampled for antenna port 0 while the corresponding symbols of slot 1 of the subframe may be sampled to calibrate the transmit path for antenna port 1.

Figure 4:
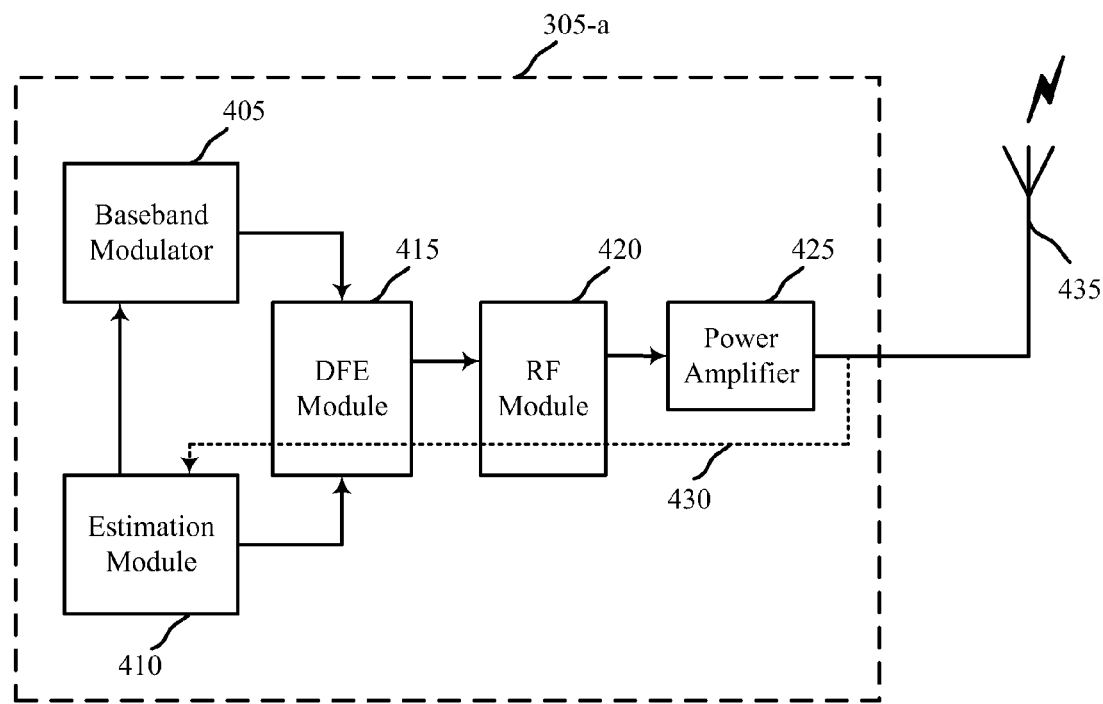
FIG. 4 is a block diagram illustrating one embodiment of a transmit path calibration module in accordance with various embodiments.

FIG. 4 is a block diagram 400 illustrating one embodiment of a transmit path calibration module 305-*a*. The module 305-*a* may be an example of the module 305 described in FIG. 3. In one example, the module 305-*a* may include various components included in a transmit path of an eNB 105. For example, the transmit path module 305-*a* may include a baseband modulator 405, an estimation module 410, a digital front end (DFE) module 415, a radio frequency (RF) module 420, and a power amplifier (PA) 425.

In one configuration, the baseband modulator 405 may modulate a baseband signal and the modulated signal may be passed to the DFE module 415. In one example, the baseband modulator 405 may be part of the DFE module 415. The DFE module 415 may perform various digital signal processing (DSP) techniques on the modulated baseband signal and the digital signal may be converted to an analog signal and passed to the RF module 420. The RF module 420 may filter the analog signal and the PA 425 may amplify the analog signal before the signal is transmitted via an antenna 435 of the eNB 105. In one embodiment, a dedicated feedback receive path 430 may exist at the output of the PA 425. The feedback path 430 may be input to the estimation module 410. The estimation module 410 may use the dedicated feedback path 430 to estimate various impairments of the transmit path of the eNB 105. The module 410 may calculate digital pre-distortion coefficients for linearization of the PA 425. In one embodiment, the calculated coefficients may be transferred to the baseband modulator 405 and the DFE module 415. It should be noted that in some cases, a connection with a UE 115 need not be established for calibration to be performed. In one example, since the dedicated feedback receive path 430 may be input to the estimation module 410, the eNB 105 does not need to receive anything from a UE 115 for transmit path calibration. Details regarding the transmit path calibration module 305-*a* will be described below.

Figure 5:
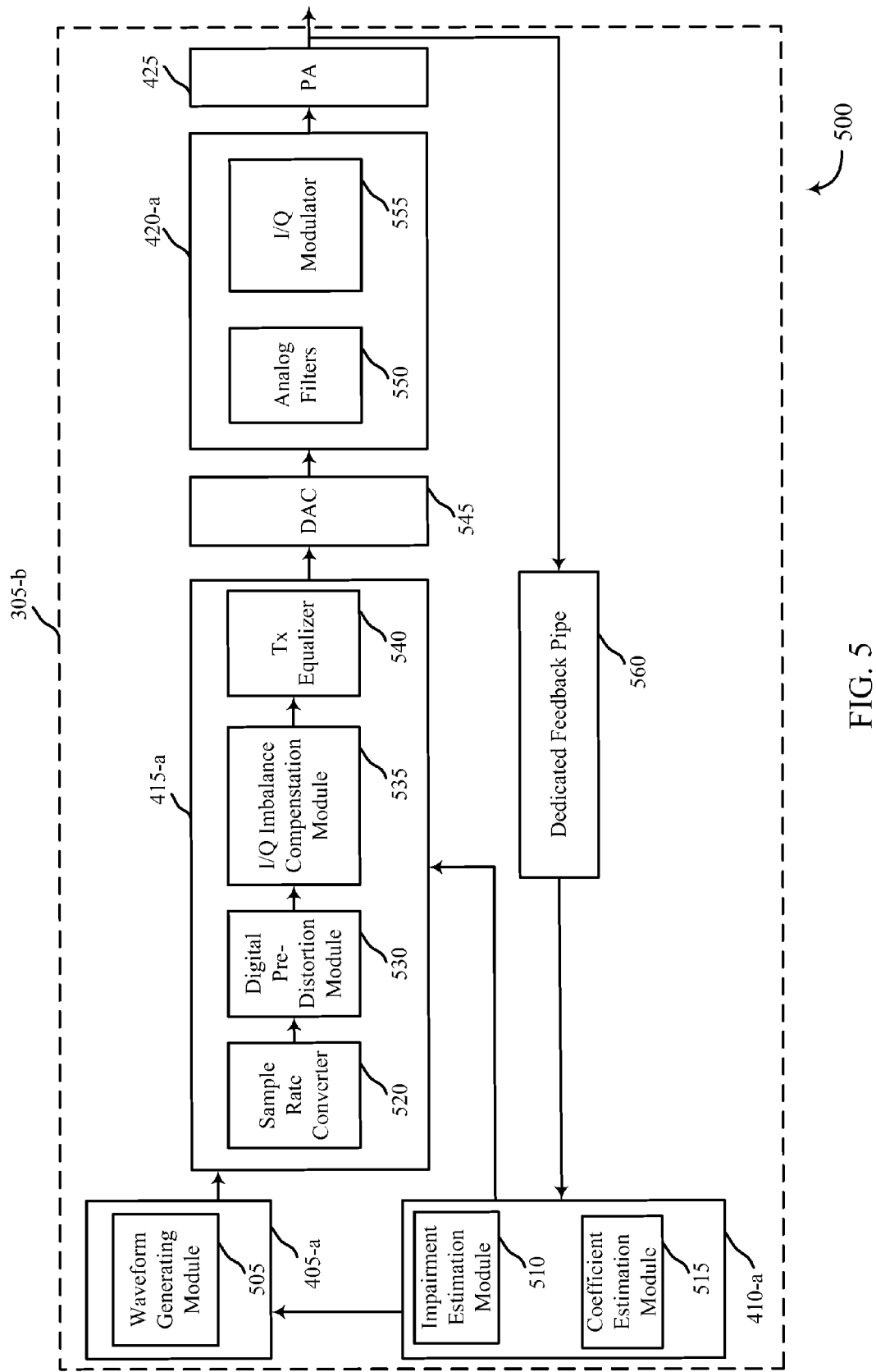
FIG. 5 is a block diagram illustrating a further embodiment of a transmit path calibration module.

FIG. 5 is a block diagram illustrating one configuration of a transmit path calibration module 305-*b*. The calibration module 305-*b* may be an example of the calibration module 305 described in FIGS. 3 and/or 4. In one example, the module 305-*b* may include various components included in a transmit path of an eNB 105. For example, the transmit path module 305-*b* may include a baseband modulator 405-*a*, an estimation module 410-*a*, a DFE module 415-*a*, a digital-to-analog converter (DAC) 545, an RF module 420-*a*, a PA 425, and a dedicated feedback pipe 560.

In one configuration, the baseband modulator 405-*a* may include a waveform generating module 505. The module 505 may generate at least one predefined waveform that may be used to calibrate the transmit path of the eNB 105. In one example, the waveform generating module 505 may retrieve one or more waveforms that have been previously stored in a memory of the eNB 105. In one configuration the waveform may be passed through the transmit path of the eNB 105 during a calibration symbol of a subframe. The subframe may be a subframe within a radio frame used for LTE downlink transmissions.

In one embodiment, the predefined waveforms may be used to calibrate various aspects of the transmit path of the eNB 105. The transmit path may be calibrated to compensate for various impairments that may be introduced by analog and RF components (e.g., in-phase/quadrature (I/Q) modulator 555, analog filters 550, PA 425, etc.) These impairments may include mismatches between the gain and phase of I/Q components, local oscillator (LO) leakage, gain variations, and non-linear effects. In some embodiments, the impairments may be subject to thermal and temporal variations. As a result, predefined waveforms may be used to calibrate the transmit path during normal system operation of the eNB. The calibration of the transmit path may occur at periodic or aperiodic intervals. An embedded feedback receive path may be used to calibrate the transmit path. The dedicated feedback pipe 560 may provide the feedback receive path. The estimation module 410-*a* may receive the feedback. In one embodiment, an impairment estimation module 510 may estimate various impairments of the transmit path from the feedback receive path. A coefficient estimation module 515 may estimate coefficients to calibrate the transmit path. The estimated coefficients may be passed to the baseband modulator 405-*a* and the DFE module 415-*a* of the eNB 105. The DFE module 415-*a* may include a sample rate converter 520, a digital pre-distortion module 530, an in-phase/quadrature (I/Q) imbalance compensation module 535, and a transmitter equalizer 540.

In one example, a calibration symbol may carry a waveform that is used to estimate I/Q imbalance. In one embodiment, calibration symbols may carry one or several tones that may be a priori known to a receiver (such as the estimation module 410-*a*). In one configuration, a single tone in the spectrum may be transmitted during the calibration symbol. The impairment estimation module 510 may use the predefined waveform to estimate an image or images caused by the I/Q imbalance in the transmit path. For example, an estimation of an image or images on the lower-side band of the spectrum may be generated. In one configuration, the image(s) may be a result of the I/Q imbalance in the transmit path of the eNB 105. The I/Q imbalance may be estimated by the impairment estimation module 510 based at least in part on the estimated image or images.

In another example, the calibration symbols may be loaded with optimized waveforms that provide a statistical representation of a maximum transmitted power symbol. For example, the waveform may represent the maximum or optimal power over full channel bandwidth the PA 425 is designed to transmit. These waveforms may be useful for pre-distortion estimation for linearization of the PA 425. In one configuration, the waveform may experience a correct amount of distortion. As a result, coefficients may be estimated by the coefficient estimation module 515 for the digital pre-distortion module 530 of the DFE 415-*a*.

Waveforms used to estimate the impairments caused by PA 425 may be a priori constructed to provide a maximum estimation of the known linearity of the PA 425. Typically, with digital pre-distortion, a transmitted pre-distorted waveform which serves as a reference may be sampled. The output of the PA 425 may also be sampled. The PA output may then be compared with the pre-distorted reference to estimate the pre-distortion coefficients. The present systems and methods may bypass the sampling of the transmit path because the predefined waveform may be a priori known to the estimation module 410-*a*. In one configuration, the predefined waveform may be pre-stored in the memory of the eNB 105. As a result, the need does not arise to sample a pre-distorted waveform during system operation of the eNB 105. In one embodiment, the calibration symbols may change within a subframe and/or a frame to detect different types of impairments. For example, one calibration symbol in a subframe may be used to detect I/Q imbalance and a second calibration symbol in the subframe may be used to detect impairments caused by the PA.

In one configuration, the Media Access Control (MAC) data communication protocol sub-layer may be unaware of these calibration symbols that are used to carry predefined waveforms for calibration purposes. As a result, the MAC layer may continuously transmit downlink data to one or more UEs 115 during the subframe. In one embodiment, the Physical (PHY) layer may override the data symbols of the subframe carrying the downlink data with one or more predefined waveforms. As a result, the UEs 115 may not receive downlink information. The UEs 115 may transmit a negative acknowledgment (NACK) to the eNB 105. The eNB 105 may re-transmit the downlink data according to a hybrid automatic repeat request (HARQ) procedure. In one embodiment, the eNB 105 may re-transmit the downlink data according to the HARQ mechanism without being aware that the PHY layer overrode data symbols with predefined waveforms.

In one configuration, the MAC layer may be aware of the periodic calibration of the transmit path. In one example, a MAC scheduler may preserve previously allocated downlink resources to a UE 115 during a subframe used for calibration purposes. Control symbols of the subframe, however, may signal zero allocation of these downlink resources to the UE 115. As a result, the UE may be signaled to not monitor for downlink traffic in this subframe. The control symbols may include, or be associated with, one or both of a downlink reference signal (RS) (i.e., pilot signals) and a downlink control channel (DCCHs). Examples of DCCHs may include, but are not limited to, Physical Downlink Control Channel (PDCCH), Physical Control Format Indicator Channel (PCFICH), and Physical Hybrid ARQ Indicator Channel (PHICH).

In one configuration, calibration symbols and control symbols of a first subframe may be transmitted. The calibration symbols may include predefined waveforms for calibration as previously explained. The control symbols may include, or be associated with, downlink reference signals and/or downlink control channels. In some cases, the downlink reference signals may include standard pilot symbols, such as LTE cell-specific reference signals. Cell-specific reference signals may depend on the number of transmit antenna ports as well as the transmission mode. In various embodiments, the downlink reference signals may include cell-specific reference signals, demodulation reference signals, channel state information (CSI) reference signals, positioning reference signals, and/or multimedia broadcast multicast services single-frequency network (MB-SFN) reference signals. In one embodiment, a certain number of additional symbols may be transmitted subsequent to the control symbols. In one configuration, at least three additional symbols may be transmitted. These additional symbols may be data OFDM symbols where data subcarriers are interleaved with RS tones. In one example, a second subframe may include the control symbols and data symbols to transmit downlink traffic data. The second subframe may be different than the first subframe. In one embodiment, the control symbols may remain unchanged from the first subframe to the second subframe.

Figure 6:
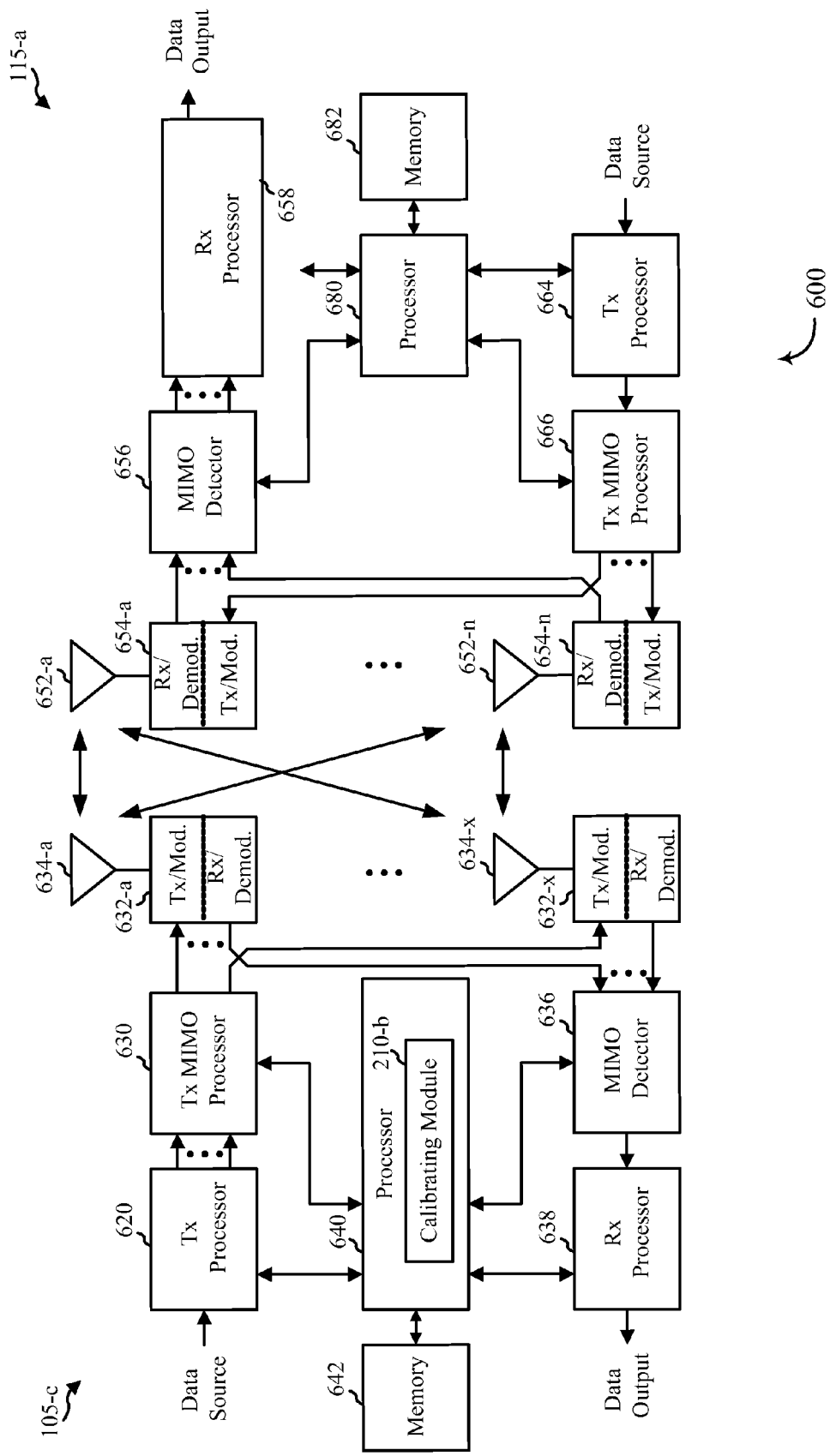
FIG. 6 is a block diagram of a MIMO communication system including a base station and a mobile device.

FIG. 6 is a block diagram of a MIMO communication system 600 including a base station (eNB) 105-*c* and a mobile device (UE) 115-*a*. This system 600 may illustrate aspects of the system 100 of FIG. 1. The base station 105-*c* may be equipped with antennas 634-*a* through 634-*x*, and the mobile device 115-*a* may be equipped with antennas 652-*a* through 652-*n*. In the system 600, the base station 105-*c* may be able to send data over multiple communication links at the same time. Each communication link may be called a "layer" and the "rank" of the communication link may indicate the number of layers used for communication. For example, in a 2×2 MIMO system where base station 105-c transmits two "layers," the rank of the communication link between the base station 105-c and the UE 115-a is two.

At the base station 105-c, a transmit processor 620 may receive data from a data source. The transmit processor 620 may process the data. The transmit processor 620 may also generate reference symbols, and a cell-specific reference signal. A transmit (TX) MIMO processor 630 may perform spatial processing (e.g., precoding) on data symbols, control symbols, and/or reference symbols, if applicable, and may provide output symbol streams to the transmit modulators 632-a through 632-x. Each modulator 632 may process a respective output symbol stream (e.g., for OFDM, etc.) to obtain an output sample stream. Each modulator 632 may further process (e.g., convert to analog, amplify, filter, and upconvert) the output sample stream to obtain a downlink signal. In one example, downlink signals from modulators 632-a through 632-x may be transmitted via the antennas 634-a through 634-x, respectively.

At the mobile device 115-a, the mobile device antennas 652-a through 652-n may receive the downlink signals from the base station 105-c and may provide the received signals to the demodulators 654-a through 654-n, respectively. Each demodulator 654 may condition (e.g., filter, amplify, downconvert, and digitize) a respective received signal to obtain input samples. Each demodulator 654 may further process the input samples (e.g., for OFDM, etc.) to obtain received symbols. A MIMO detector 656 may obtain received symbols from all the demodulators 654-a through 654-n, perform MIMO detection on the received symbols if applicable, and provide detected symbols. A receive processor 658 may process (e.g., demodulate, deinterleave, and decode) the detected symbols, providing decoded data for the mobile device 115-a to a data output, and provide decoded control information to a processor 680, or memory 682. In one embodiment, the UE 115-a may monitor for downlink transmissions on the downlink channel. The UE 115-a may receive a first subframe on the downlink channel. The subframe may include a calibration symbol that includes a predefined waveform. In one configuration, the UE 115-a may receive one or more control symbols that include reference signals and downlink control channels. The control symbols may signal to the UE 115-a zero allocation of downlink resources of the subframe. In one example, the UE 115-a may receive a second subframe that includes the control symbols signaling an allocation of downlink resources. The second subframe may include data symbols that include traffic data for the UE 115-a.

On the uplink, at the mobile device 115-a, a transmit processor 664 may receive and process data from a data source. The transmit processor 664 may also generate reference symbols for a reference signal. The symbols from the transmit processor 664 may be precoded by a transmit MIMO processor 666 if applicable, further processed by the demodulators 654-a through 654-n (e.g., for SC-FDMA, etc.), and be transmitted to the base station 105-c in accordance with the transmission parameters (e.g., an identification of allocated resources) received from the base station 105-c. At the base station 105-c, the uplink signals from the mobile device 115-a may be received by the antennas 634, processed by the demodulators 632, detected by a MIMO detector 636 if applicable, and further processed by a receive processor. The receive processor 638 may provide decoded data to a data output and to the processor 640. The processor 640 may include a calibrating module 210-b. The calibrating module 210-b may be an example of the module 210 described with reference to FIGS. 2 and/or 3. The calibrating module 210-b may generate at least one calibration symbol of a subframe for transmission on a downlink channel. The module 210-b may further transmit the at least one calibration symbol of the subframe. The calibration symbol may include a predefined waveform to calibrate the transmit path of the base station 105-c.

The components of the mobile device 115-a may, individually or collectively, be implemented with one or more Application Specific Integrated Circuits (ASICs) adapted to perform some or all of the applicable functions in hardware. Each of the noted modules may be a means for performing one or more functions related to operation of the system 600. Similarly, the components of the base station 105-c may, individually or collectively, be implemented with one or more Application Specific Integrated Circuits (ASICs) adapted to perform some or all of the applicable functions in hardware. Each of the noted components may be a means for performing one or more functions related to operation of the system 600.

Figure 7:
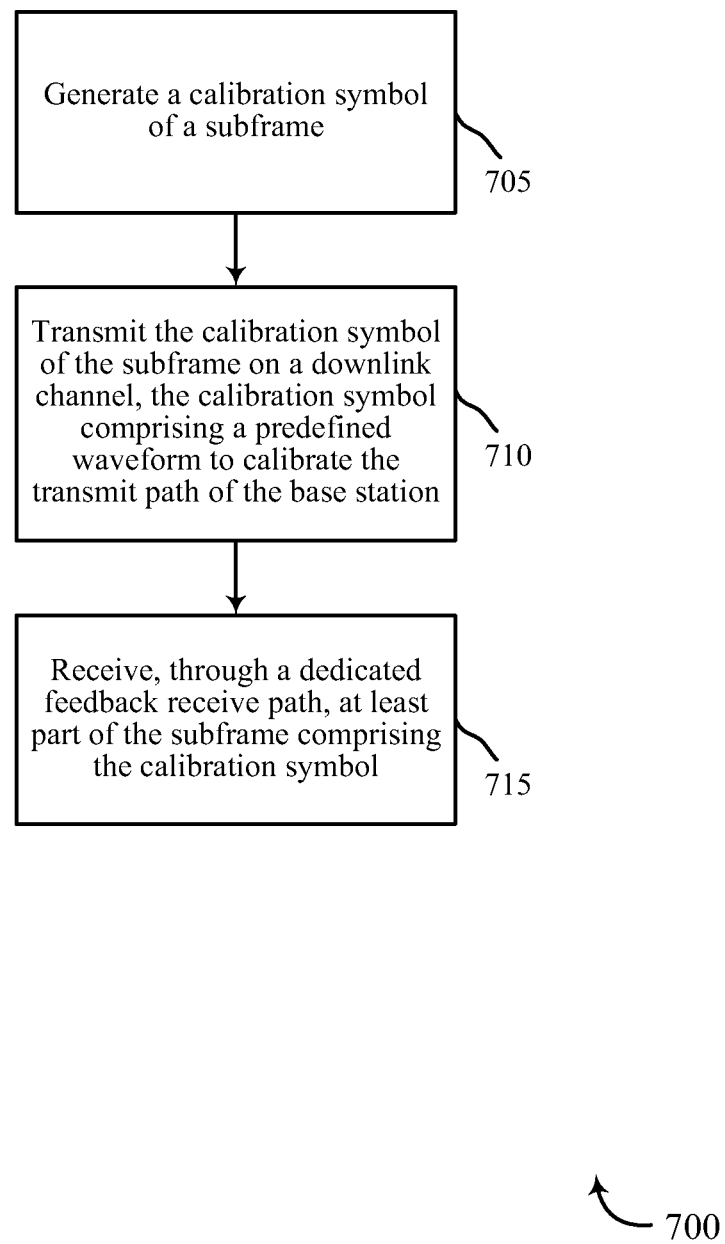
FIG. 7 is a flow chart illustrating an example of a method for calibrating a transmit path of a base station.

FIG. 7 is a flow chart illustrating an example of a method 700 for calibrating a transmit path of a base station 105. For clarity, the method 700 is described below with reference to one of the base stations 105 shown in FIGS. 1, 2, 3, and/or 6. In one implementation, the calibrating module 210 may execute one or more sets of codes to control the functional elements of a base station 105 to perform the functions described below.

In one embodiment, at block 705, a calibration symbol of a subframe may be generated. At block 710, the calibration symbol of the subframe may be transmitted on a downlink channel. In one configuration the calibration symbol may include one or more predefined waveforms. The waveforms may be used to calibrate the transmit path of the base station. At block 715, at least part of the subframe may be received. In one configuration the at least part of the subframe may be received through a dedicated feedback receive path. The at least part of the subframe may include the calibration symbol.

Thus, the method 700 may provide for calibrating the transmit path of a base station in a wireless communications system. It should be noted that the method 700 is just one implementation and that the operations of the method 700 may be rearranged or otherwise modified such that other implementations are possible.

Figure 8:
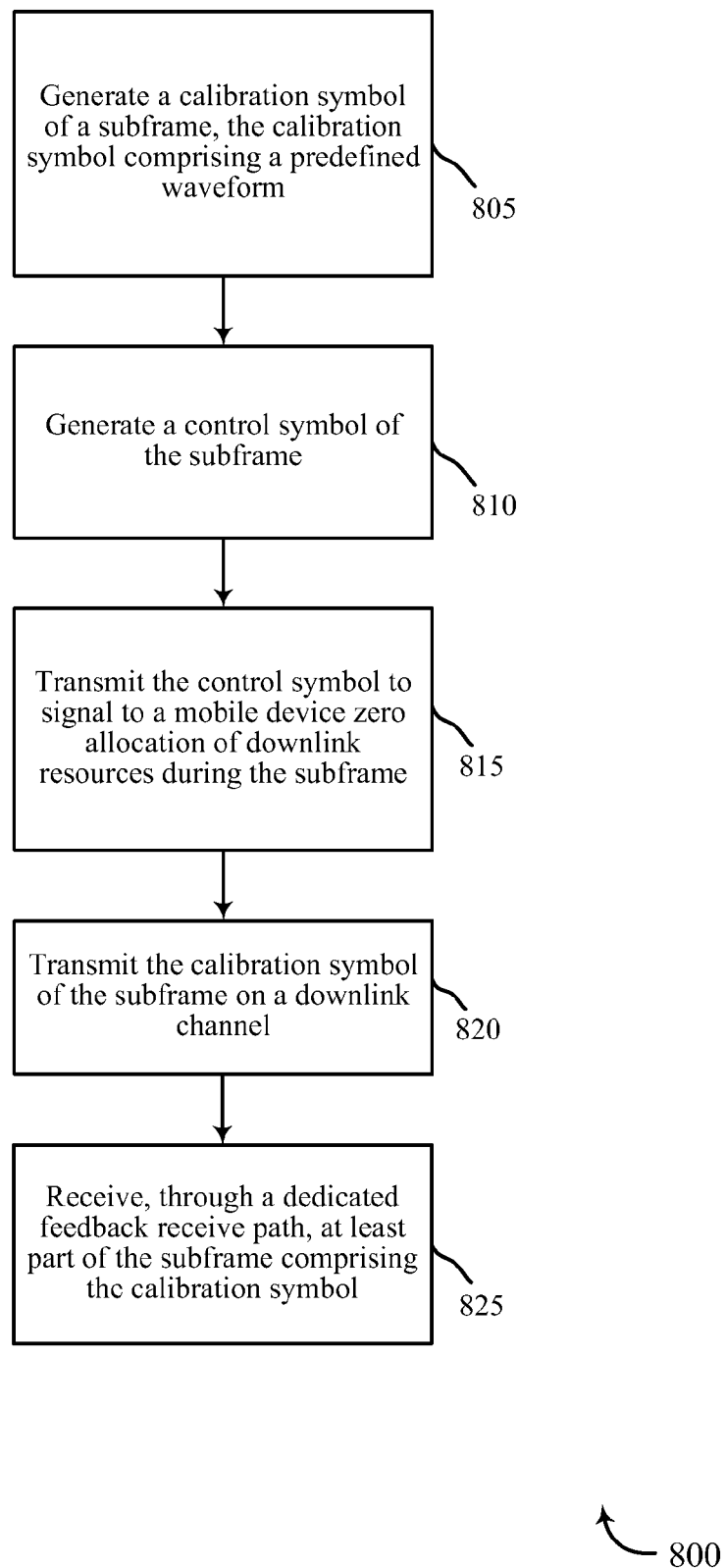
FIG. 8 is a flow chart illustrating a further example of a method for calibrating a transmit path of a base station.

FIG. 8 is a flow chart illustrating an example of a method 800 for calibrating a transmit path of a base station 105. For clarity, the method 800 is described below with reference to one of the base stations 105 shown in FIGS. 1, 2, 3, and/or 6. In one implementation, the calibrating module 210 may execute one or more sets of codes to control the functional elements of a base station 105 to perform the functions described below.

In one embodiment, at block 805, a calibration symbol of a subframe may be generated. The calibration symbol may include a predefined waveform used to calibrate the transmit path of the base station 105. At block 810, a control symbol of the subframe may be generated. The control symbol may include, or be associated with, one or more reference signals and/or downlink control channels (e.g., PDCCH, PCFICH, PHICH). At block 815, the control symbol may be transmitted. The control symbol may signal to a mobile device zero allocation of downlink resources during the subframe. At block 820, the calibration symbol of the subframe may be transmitted on a downlink channel. In one configuration the calibration symbol may include one or more predefined waveforms. The waveforms may be used to calibrate the transmit path of the base station. At block 825, at least part of the subframe may be received. In one configuration the at least part of the subframe may be received through a dedicated feedback receive path. The at least part of the subframe may include the calibration symbol.

Thus, the method 800 may provide for calibrating the transmit path of a base station in a wireless communications system. It should be noted that the method 800 is just one implementation and that the operations of the method 800 may be rearranged or otherwise modified such that other implementations are possible.

Figure 9:
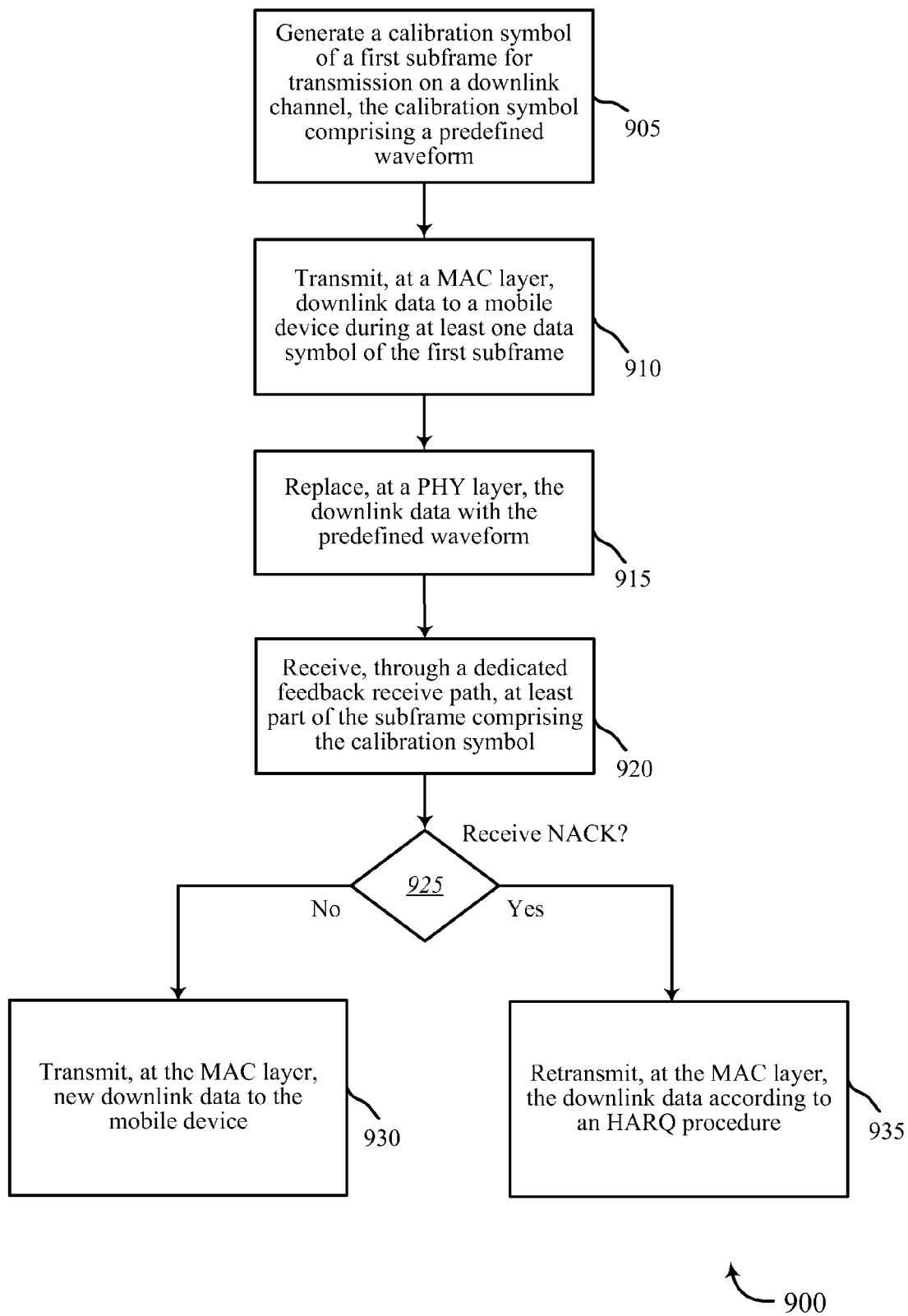
FIG. 9 is a flow chart illustrating a further example of a method for calibrating a transmit path of a base station.

FIG. 9 is a flow chart illustrating an example of a method 900 for calibrating a transmit path of a base station 105. For clarity, the method 900 is described below with reference to one of the base stations 105 shown in FIGS. 1, 2, 3, and/or 6. In one implementation, the calibrating module 210 may execute one or more sets of codes to control the functional elements of a base station 105 to perform the functions described below.

In one embodiment, at block 905, a calibration symbol of a subframe may be generated. The calibration symbol may be generated for transmission on a downlink channel. The symbol may include a predefined waveform. The waveform may be used to calibrate the transmit path and compensate for impairments caused by various RF components in the transmit path of the base station 105. At block 910, downlink data may be transmitted at the MAC layer to a mobile device during at least one data symbol of the subframe. At block 915, the downlink data may be replaced at the PHY layer with the predefined waveform. At block 920, at least part of the subframe may be received. In one configuration the at least part of the subframe may be received through a dedicated feedback receive path. The at least part of the subframe may include the calibration symbol. A determination may be made at block 925 as to whether a NACK is received from the mobile device. It should be noted that the determination block 925 may be a consequence of block 915 and/or block 910. However, in some cases, it is represented after block 920 since often at least part of the subframe is received before a NACK would be received, such as since it is received through a dedicated feedback receive path and does not require a response from another device. If it is determined that the NACK is not received, new downlink data may be transmitted, at the MAC layer, to the mobile device at block 930. If, however, it is determined that the NACK is received, at block 935, the downlink data may be retransmitted at the MAC layer according to an HARQ procedure.

Thus, the method 900 may provide for calibrating the transmit path of a base station in a wireless communications system by replacing downlink traffic with the predefined waveform that may be used for the calibration of the transmit path. It should be noted that the method 900 is just one implementation and that the operations of the method 900 may be rearranged or otherwise modified such that other implementations are possible.

The communication networks that may accommodate some of the various disclosed embodiments may be packet-based networks that operate according to a layered protocol stack. For example, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. At the Physical layer, the transport channels may be mapped to Physical channels.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM□, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. As used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for calibrating a transmit path of a base station, comprising:
   generating a predefined waveform;
   inserting the predefined waveform in a calibration symbol;
   constructing a subframe;
   transmitting, at a media access control (MAC) layer, downlink data to a user equipment during the subframe;
   replacing, at a physical (PHY) layer, the downlink data of the subframe with the calibration symbol;
   receiving, at the base station, through a dedicated feedback receive path, at least part of the subframe comprising the calibration symbol; and
   calibrating the transmit path of the base station based at least in part on the received calibration symbol.

2. The method of claim 1, wherein calibrating the transmit path comprises:
   estimating a transmit path impairment based at least in part on the received calibration symbol;
   determining a compensation value based at least in part on the transmit path impairment; and
   calibrating the transmit path of the base station based at least in part on the compensation value.

3. The method of claim 1, further comprising:
   monitoring transmissions on the downlink channel through a dedicated feedback receive path.

4. The method of claim 1, further comprising:
   transmitting a control symbol of the subframe, wherein the control symbol is associated with one or both of a downlink reference signal and a downlink control channel.

5. The method of claim 4, further comprising:
   transmitting at least three additional symbols comprising downlink reference signals.

6. The method of claim 4, wherein the downlink control channel comprises at least one of a Physical Downlink Control Channel (PDCCH), a Physical Control Format Indicator Channel (PCFICH), or a Physical Hybrid Automatic Request Indicator Channel (PHICH).

7. The method of claim 1, further comprising:
   transmitting a control symbol of the subframe to signal to the user equipment zero allocation of downlink resources during the subframe.

8. The method of claim 1, further comprising:
   receiving a negative acknowledgement (NACK); and
   retransmitting, at the MAC layer, the downlink data according to a hybrid automatic repeat request (HARQ) procedure.

9. The method of claim 1, wherein the predefined waveform comprises:
   a representation of a maximum transmitted power signal of a power amplifier over maximum useful channel bandwidth.

10. The method of claim 9, further comprising:
    using the predefined waveform to estimate digital pre-distortion coefficients for linearization of the power amplifier.

11. The method of claim 1, wherein the predefined waveform comprises:
    an a priori tone to estimate an in-phase/quadrature (I/Q) imbalance of the transmit path.

12. The method of claim 11, further comprising:
using the predefined waveform to estimate an image caused by the I/Q imbalance in the transmit path; and
estimating the I/Q imbalance based at least in part on the estimated image.

13. The method of claim 1, wherein a first slot of the subframe comprises the calibration symbol and the transmit path is associated with a first antenna of the base station, the method further comprising:
calibrating a second transmit path of a second antenna of the base station during a second slot of the subframe, the second slot comprising a calibration symbol to carry a second predefined waveform to calibrate the second transmit path of the second antenna.

14. A base station configured to calibrate a transmit path, comprising:
a processor;
a memory in electronic communication with the processor; and
instructions stored in the memory, the instructions being executable by the processor to:
generate a predefined waveform;
insert the predefined waveform in a calibration symbol;
construct a subframe;
transmit, at a media access control (MAC) layer, downlink data to a user equipment during the subframe;
replace, at a physical (PHY) layer, the downlink data of the subframe with the calibration symbol;
receive, at the base station, through a dedicated feedback receive path, at least part of the subframe comprising the calibration symbol; and
calibrate the transmit path of the base station based in least in part on the received calibration symbol.

15. The base station of claim 14, wherein the instructions executable by the processor to calibrate the transmit path comprise instructions executable by the processor to:
estimate a transmit path impairment based at least in part on the received calibration symbol;
determine a compensation value based at least in part on the transmit path impairment; and
calibrate the transmit path of the base station based at least in part on the compensation value.

16. The base station of claim 14, wherein the instructions are executable by the processor to:
monitor transmissions on the downlink channel through a dedicated feedback receive path.

17. The base station of claim 14, wherein the instructions are executable by the processor to:
transmit a control symbol of the subframe to signal to the user equipment zero allocation of downlink resources during the subframe.

18. The base station of claim 14, wherein the predefined waveform comprises:
a representation of a maximum transmitted power signal of a power amplifier over maximum useful channel bandwidth.

19. The base station of claim 18, wherein the instructions are executable by the processor to:
use the predefined waveform to estimate digital pre-distortion coefficients for linearization of the power amplifier.

20. The base station of claim 14, wherein the predefined waveform comprises:
an a priori tone to estimate an in-phase/quadrature (I/Q) imbalance of the transmit path.

21. A method for calibrating a transmit path of a base station, comprising:
generating a predefined waveform;
inserting the predefined waveform in a calibration symbol;
preserving, at a media access control (MAC) layer, previously allocated downlink resources for the calibration symbol;
constructing a subframe, wherein the preserved downlink resources comprise the calibration symbol;
transmitting the subframe from the base station to a user equipment on a downlink channel;
receiving, at the base station, through a dedicated feedback receive path, at least part of the subframe comprising the calibration symbol; and
calibrating the transmit path of the base station based at least in part on the received calibration symbol.

22. The method of claim 21, wherein calibrating the transmit path comprises:
estimating a transmit path impairment based at least in part on the received calibration symbol;
determining a compensation value based at least in part on the transmit path impairment; and
calibrating the transmit path of the base station based at least in part on the compensation value.

23. The method of claim 21, further comprising:
monitoring transmissions on the downlink channel through the dedicated feedback receive path.

24. A base station configured to calibrate a transmit path, comprising:
a processor;
a memory in electronic communication with the processor; and
instructions stored in the memory, the instructions being executable by the processor to:
generate a predefined waveform;
insert the predefined waveform in a calibration symbol;
preserve, at a media access control (MAC) layer, previously allocated downlink resources for the calibration symbol;
construct a subframe, wherein the preserved downlink resources comprise the calibration symbol;
transmit the subframe from the base station to a user equipment on a downlink channel;
receive, at the base station, through a dedicated feedback receive path, at least part of the subframe comprising the calibration symbol; and
calibrate the transmit path of the base station based at least in part on the received calibration symbol.

25. The base station of claim 24, wherein the instructions executable by the processor to calibrate the transmit path comprise instructions executable by the processor to:
estimate a transmit path impairment based at least in part on the received calibration symbol;
determine a compensation value based at least in part on the transmit path impairment; and
calibrate the transmit path of the base station based at least in part on the compensation value.

26. The base station of claim 24, wherein the instructions are executable by the processor to:
monitor transmissions on the downlink channel through the dedicated feedback receive path.

* * * * *